(12) United States Patent
Osborn

(10) Patent No.: US 6,426,687 B1
(45) Date of Patent: Jul. 30, 2002

(54) RF MEMS SWITCH

(75) Inventor: Jon Victor Osborn, Thousand Oaks, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/862,954

(22) Filed: May 22, 2001

(51) Int. Cl.[7] .................................................. H01P 1/10
(52) U.S. Cl. ........................ 333/262; 333/105; 200/181
(58) Field of Search ................................. 333/262, 105, 333/258; 200/181

(56) References Cited

U.S. PATENT DOCUMENTS

| | | | | |
|---|---|---|---|---|
| 5,051,643 A | * | 9/1991 | Dworsky et al. | 310/309 |
| 5,367,585 A | * | 11/1994 | Ghezzo et al. | 385/23 |
| 5,479,042 A | * | 12/1995 | James et al. | 257/415 |
| 5,544,001 A | * | 8/1996 | Ichiya et al. | 361/233 |
| 6,307,452 B1 | * | 10/2001 | Sun | 333/262 |
| 6,366,186 B1 | * | 4/2002 | Hill et al. | 335/78 |

* cited by examiner

Primary Examiner—Robert Pascal
Assistant Examiner—Dean Takaoka
(74) Attorney, Agent, or Firm—Derrick Michael Reid

(57) ABSTRACT

A radio frequency (RF) microelectromechanical systems (MEMS) switch is manufactured by independent processing and subsequent bonding together of a MEMS substrate in alignment with an RF substrate. The RF MEMS switch is designed so as to encapsulate a flexing diaphragm supporting a switch electrode used with electrostatic flexing potentials to move electrodes of the MEMS substrate up and down over an RF transmission line structure of the RF substrate. The bonded combined MEMS switch structure is used to create an encapsulated RF MEMS switch suitable for direct coupling, AC coupling, and direct modulation of RF signals. The resulting MEMS RF switch device provides a reliable, minimally distorting RF transmission line geometry, free of contamination for use in high speed RF signal switching applications well suited for advance communication RF switching requirements.

18 Claims, 3 Drawing Sheets

RF MEM SWITCH

GROUNDED COPLANAR WAVEGUIDE PATTERN

ACTUATOR ELECTRODE PATTERN

BRIDGE ELECTRODE PATTERN

DIAPHRAGM PATTERN

RF MEM SWITCH

RF MEMS SWITCH

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of radio frequency (RF) devices and semiconductor manufacturing processes. More particularly, the present invention relates to RF switches using semiconductors microelectromechanical systems (MEMS) and semiconductor manufacturing processes.

BACKGROUND OF THE INVENTION

Radio frequency (RF) devices are commonly used in communication systems where high frequency operation is required. One device used in communication systems is an RF switch that is a mechanical switch switching at high-speed for use in RF communication systems. Microelectromechanical systems (MEMS) are miniature devices that are being manufactured in a wide variety of mechanical forms. MEMS devices are inherently both mechanical and electrical devices that are subject to wear and contamination and suffer from limited life times. Electrical functionality is often limited by the mechanical durability of the MEMS devices. RF MEMS switches offer high-speed operation for RF communication systems but suffer from speed limitations inherent in mechanical systems.

U.S. Pat. No. 5,578,976 issued Nov. 26, 1996 discloses an RF MEMS switch device. This switch device has a suspended arm that is attached on one side to a substrate and provides a conductive pad on another freely suspended side using a cantilever arm that extends over a ground line. The device is subject to contamination. The freely suspended cantilever arm suffers from an inherent mechanical weakness by virtue of flexing back and forth the cantilever arm at a single connection point. The switch device can be used as an AC capacitive coupler for communicating an RF signal across DC biased contacts on the cantilever arm and the supporting substrate. The RF MEMS switch with a suitable DC bias can also function as a DC coupled RF switch.

U.S. Pat. No. 5,638,946 issued Jun. 12, 1997 also discloses an RF MEMS switch and also discloses a suspended arm that is attached on one side to a substrate as a cantilever arm suffering from a single point of flexing wear and stresses on the attached side of the arm. This RF MEMS switch also suffers from contamination and limited lifetime. The RF MEMS device is suitable as a direct DC switch coupler or as an AC coupler with a limited operation frequency range.

These RF MEMS switches, though intended to operate at high switching speed, are limited in speed of actuation due to the inherent nature of the extended cantilever arm that must substantially flex up and down during operation over the electrical contacts and waveguides. The RF MEMS switches suffer from contamination due to exposure of debris formed during both manufacture and operational use. The asymmetric suspension mechanical configuration functions as an uncontrolled one ended suspension spring, providing uncontrolled mechanical oscillations during use, disadvantageously effecting the electrical performance of the RF switch. The RF switches are made larger than that minimally required due to the suspension cantilever arm, due to the use as a mechanical spring return, and due to the substrate pad placement being extended to the end of the cantilever arm. The physical arrangement of the RF switch electrodes significantly deviates from an ideal RF transmission line and consequently perturbs the propagation of RF signals due to impedance mismatch. Additionally, because of the inherent rotational operation of the contact end of the cantilever arm, the RF switch exhibits an asymmetric electrical performance as the arm rotationally flexes during operation when the contact pads are not consistently aligned with the substrate contact pads. The contact pads, when in contact with each other, suffer from stiction that slows the speed of operation and limits the effective operating range of the MEMS RF switches. These and other disadvantages are solved or reduced using the present invention.

SUMMARY OF THE INVENTION

An object of the invention is to provide a microelectromechanical systems (MEMS) radio frequency (RF) switch for high-speed electrical operation.

Another object of the invention is to provide a MEMS RF switch that is resistant to external contamination during use.

Yet another object of the invention is to provide a MEMS RF switch that can be controlled by opposing DC bias voltages for controlled electrical operation.

Still another object of the invention is to provide a MEMS RF switch having equilaterally suspended contacts for evenly distributed flexing and wear during operational use.

A further object of the invention is to provide a MEMS RF switch that is resistant to contamination through MEMS encapsulation of the operational contact pads of the MEMS RF switch during manufacture.

Another object of the invention is to provide a MEMS RF switch that has contact pads subject to both pull up and pull down biasing for controlled electrical operation.

Still another object of the invention is to provide a MEMS RF switch that can be operated as an RF AC coupler during operational use.

Still another object of the invention is to provide a MEMS RF switch that can be operated with direct con tact symmetric coupling during operational use.

Yet another object of the invention is to provide a MEMS RF switch having distortion free RF operation by virtue of equilateral coupling suspension with uniform signal propagation along an uninterrupted RF transmission.

The invention is directed to a MEMS RF switch that is optimized for operation over 1 GHz. The device has a vertical contact pad alignment configuration of electrodes and transmission lines such that minimal RF distortion, loss, and reflections will be created in the switch. Distortion free operation is accomplished by the use of a continuous grounded coplanar transmission line structure for the RF transmission line through the MEMS switch structure. The switch has on and off transition times that are symmetric and perfected by electrostatic actuation in both up and down directions. The vertical alignment configuration of electrodes contacts and waveguides have a minimal area switch contact with minimum moving mass during electrostatic actuation. The actuation electrodes are suspended above the transmission line and move up and down during minimal supporting spring forces during electrostatic actuation. The switch mechanical design provides rapid ON and OFF switching times. The switching speed is primarily a function of the inertia of the rest mass and switching potential of the electrostatic potentials that can further function to restore the switch to the ON or OFF conditions.

The RF switch is a MEMS device for switching signals through an RF transmission line. The RF MEMS switch is enclosed using two opposing substrates bonded together. A MEMS electrode substrate and an RF transmission line substrate are firstly separately manufactured and then bonded together to encapsulate, that is, entomb the composite RF MEMS switch. The opposing substrate switch design enables independent fabrication and process optimization of both the MEMS switch portion and RF transmission line portion of the composite RF MEMS switch. The composite substrate configuration of the RF MEMS switch increases manufacturing yields with improved performance. The RF MEMS switch is fabricated by wafer bonding the MEMS switch substrate in vertical alignment with the RF transmission line substrate so that electrostatic electrodes and switch coupler of the MEMS switch substrate are in respective vertical alignment with electrostatic electrodes and RF transmission lines of the RF transmission line substrate. The opposing substrate bonding process enables the RF transmission wafer and MEMS switch wafer, when bonded together, to be hermetically sealed from ambient dirt and contamination by encapsulation further increasing switch yield and long term switch reliability. After wafer bonding, the composite wafers maybe further processed using conventional packaging and wafer-sawing methods without risk of contaminating the delicate released MEMS structures. These and other advantages will become more apparent from the following detailed description of the preferred embodiment.

DETAILED DESCRIPTION OF THE PREFERRED EMBODIMENT

Figure 1A:
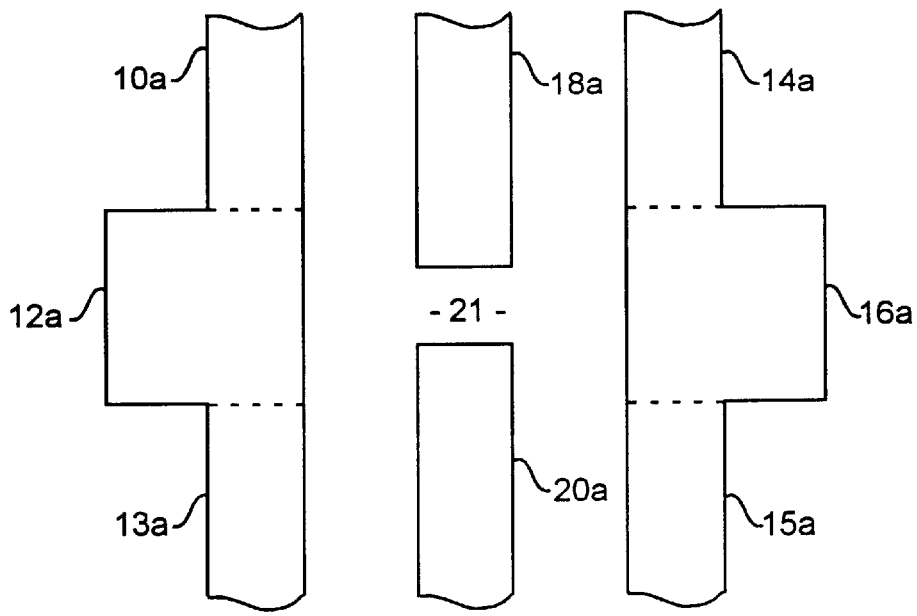
FIG. 1A depicts a grounded coplanar waveguide pattern.
Figure 1B:
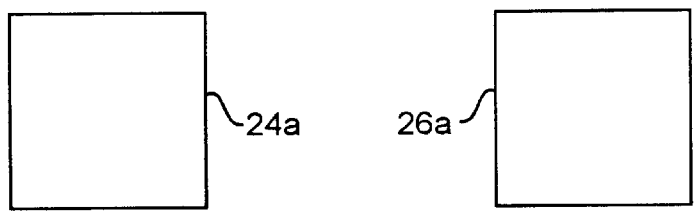
FIG. 1B depicts an actuator electrode pattern.
Figure 1C:
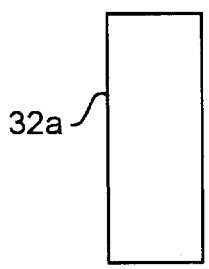
FIG. 1C depicts a bridge electrode pattern.
Figure 2:
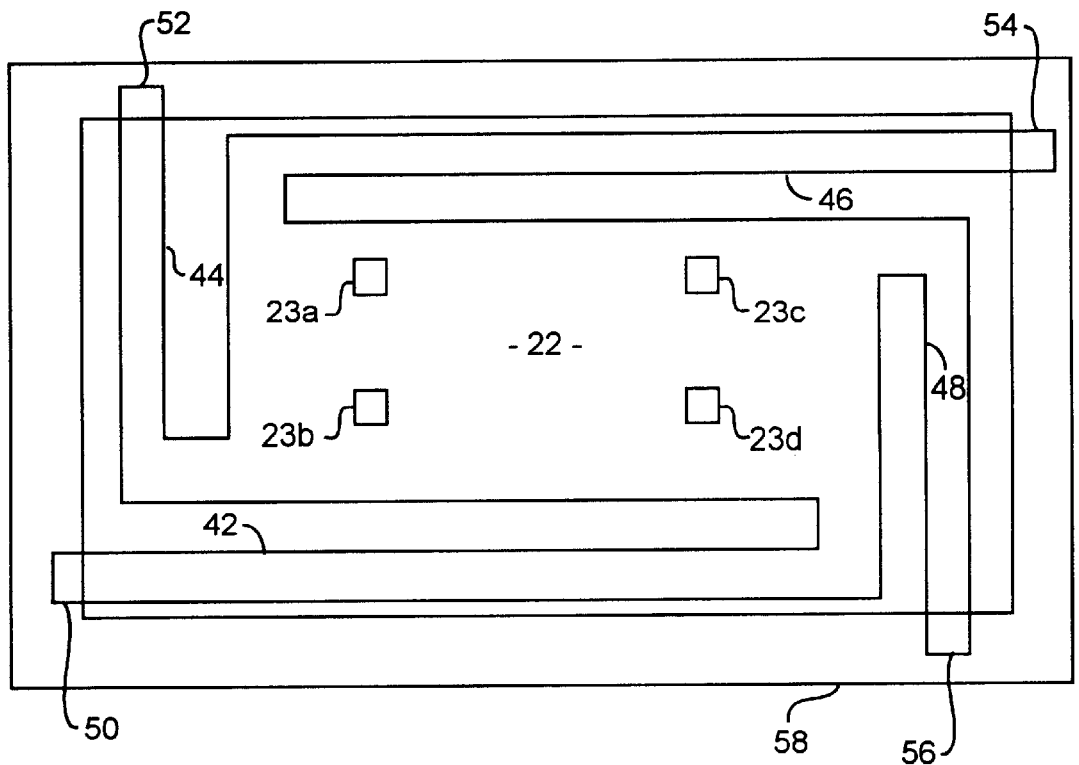
FIG. 2 is a top view of a diaphragm.
Figure 3:
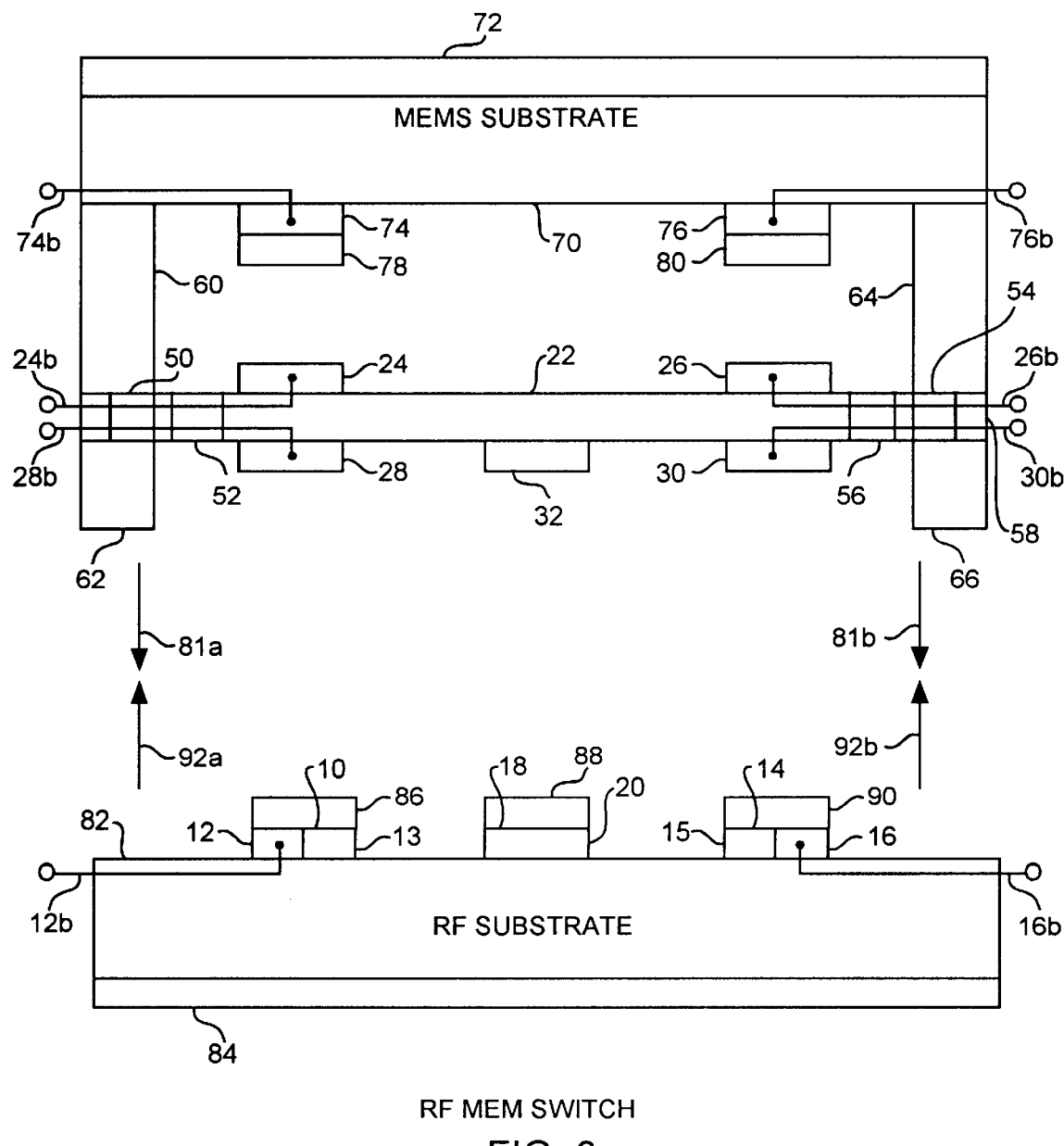
FIG. 3 is a side view of a RF MEMS switch.

An embodiment of the invention is described with reference to the figures using reference designations as shown in the figures. Referring to all of the figures, various features of the RF MEMS switch are formed using semiconductor photolithographic patterns, designated with an "a" extension of the reference designations as used in the figures. Input and output conduction lines are electrically connected to external signals using electrical traces that are designated with a "b" extension of the reference designations as also used in the figures.

An RF grounded coplanar waveguide transmission line structure is formed by electrode photolithography patterns. A back left grounded coplanar waveguide 10 is formed using a back left grounded coplanar waveguide pattern 10a and extends externally for electrical connection. A left lower actuator electrode 12 is formed using grounded coplanar waveguide pattern 12a shown preferably extending to pattern 10a, and having a left lower actuator electrode bias conductor 12b. A front left grounded coplanar waveguide 13 is formed using a grounded coplanar waveguide pattern 13a, shown extending through pattern 12a to pattern 10a and extends externally for electrical connection. A back right grounded coplanar waveguide 14 is formed using a back right grounded coplanar waveguide pattern 14a and extends externally for electrical connection. A front right grounded coplanar waveguide 15 is formed using a front right grounded coplanar waveguide pattern 15a and extends externally for electrical connections. A right lower actuator electrode 16 is formed preferably using a right lower actuator electrode pattern 16a and extends externally using a right lower actuator electrode bias conductor 16b. A back center coplanar waveguide 18 is formed using a back center coplanar waveguide pattern 18a and extends externally for electrical connection. A front center coplanar waveguide 20 is formed using a front center coplanar waveguide pattern 20a and extends externally for electrical connection. Between the front and back center coplanar waveguides 18 and 20 is disposed a center coplanar waveguide gap 21. Signal grounds are carried on electrodes 10a, 13a, 14a, and 15a. Grounded actuator electrode patterns are shown as 12a and 16a, and are placed either adjacent to electrodes 10a, 13a, 14a, and 15a, or in direct electrical contact with the electrodes 10a, 13a, 14a, and 15a. RF signals are carried on a transmission line consisting of electrodes 20a and 18a. The photolithographic patterns are fabricated using conventional integrated circuit and MEMS fabrication processes known to those skilled in the art.

A diaphragm 22, preferably having a plurality of diaphragm apertures 23a, 23b, 23c and 23d, is flexible and suspended above the coplanar waveguide consisting of traces 10, 13, 14, 15, 18 and 20. The diaphragm 22 provides support for electrical elements operating in combination with the coplanar waveguide. A left upper diaphragm actuator electrode 24 is formed using a left actuator electrode pattern 24a and extends externally with a left upper diaphragm actuator electrode bias conductor 24b. A right upper diaphragm actuator electrode 26 is formed using a right actuator electrode pattern 26a and extends externally using a right upper diaphragm actuator electrode bias conductor 26b. A left lower diaphragm actuator electrode 28 is formed using the left actuator electrode pattern 24a and extends externally using a left lower diaphragm actuator electrode bias conductor 28b. A right lower diaphragm actuator electrode 30 is formed using the right actuator electrode pattern 26a and extends externally using a right lower diaphragm actuator electrode bias conductor 30b. A bridge electrode 32 is formed using a bridge electrode pattern 32a and does not extend externally and is suspended by the diaphragm to be centered over the gap 21.

The diaphragm 22 is equilaterally suspended using a front diaphragm arm 42, a left diaphragm arm 44, a back diaphragm arm 46, and a right diaphragm arm 48. The diaphragm arms 42, 44, 46, and 48, are respectively used to suspend the diaphragm 22 using a front diaphragm arm anchor 56, a left diaphragm arm anchor 50, a back diaphragm arm anchor 52, and a right diaphragm arm anchor 54. The anchors 56, 50, 52, and 54 extend into and become part of a diaphragm mounting frame 58 that supports the diaphragm 22 through the arms 42, 44, 46, and 48 and respective anchors 50, 52, 54 and 56. The diaphragm 22 and mounting frame 58 is suspended using a left upper diaphragm pedestal 60, a left lower diaphragm pedestal 62, a right upper diaphragm pedestal 64, and a right lower diaphragm pedestal 66. The pedestals 60 and 64 are used to suspend and offset in position the diaphragm 22 from a MEMS substrate 70 having a MEMS substrate grounded plane 72.

The MEMS substrate also supports electrical elements for flexing the diaphragm 22. A left upper actuator electrode 74 is formed using the left actuator electrode pattern 24a and extends externally through an upper actuator electrode bias conductor 74b. A right upper actuator electrode 76 is formed using the right actuator electrode pattern 26a and extends externally through a right upper actuator electrode bias conductor 76b. A left upper actuator electrode insulator 78 is preferably formed on the left upper actuator electrode 74 using the left actuator electrode pattern 24a. A right upper actuator electrode insulator 80 is preferably formed on the right upper actuator electrode 76 using the right actuator electrode pattern 26a. The left actuator electrodes 24, 28, 12, and 74, are in preferred vertical alignment respecting each other as are all of the right actuator electrodes 26, 30, 16, and 76.

The pedestals 62 and 66 are used to standoff the diaphragm 22 in respective directions of a left MEMS substrate bonding direction 81a and a right MEMS substrate bonding direction 81b extending equally and in parallel to standoff the diaphragm 22 from an RF substrate 82 having an RF substrate ground plane 84. The coplanar waveguide traces 10, 13, 14, 15, 18, and 20, the lower actuator electrodes 12 and 16, and the gap 21 are disposed on the RF substrate 82. A left lower actuator electrode insulator 86 is formed using the left actuator electrode pattern 24a and disposed over the left lower electrode 12. A center coplanar waveguide insulator 88 is formed using the bridge electrode pattern 32a and disposed over the gap 21 and over ends of the front and back center waveguides 18 and 20, so as to function as a capacitive dielectric between the ends of the waveguides 18 and 20 to the bridge electrode 22 so as to provide two series capacitive coupling dielectrics at the two ends of front and back center coplanar waveguides 18 and 20. A right lower actuator electrode insulator 90 is formed using the right actuator electrode pattern 26a and disposed over the right lower actuator electrode 16. These insulators 78, 80, 86, and 90 are respectively used for electrical conduction isolation between electrodes 24 and 74, 26 and 76, 28 and 12, and 30 and 16. The RF substrate 82 is bonded to the left lower diaphragm pedestal 62 and the right lower diaphragm pedestal 66 when moving the RF substrate 82 towards the pedestals 62 and 66 respectively along a left RF substrate bonding direction 92a and a right RF substrate bonding direction 92b. The left and right RF substrate bonding directions 92a and 92b are in opposing alignment with the left and right MEMS substrate bonding directions 81a and 81b. When the pedestals 60 and 64 are bonded to the MEMS substrate 70, when the diaphragm 22 and frame 58 is supported between the pedestals 60, 62, 64, and 66, and when the RF substrate is bonded to the pedestals 62 and 66, all of the electrodes 12, 16, 24, 26, 28, 30, 74, and 76, the coplanar waveguide 10, 13, 14, 15, 18, 20, 21, bridge 32, diaphragm 22 as well as the insulators 78, 80, 86, 88 and 90 are all entombed through encapsulation using the opposing MEMS substrate 22 as a ceiling, the RF substrate as a floor, and the pedestals 60, 62, 64, and 66 as side walls.

In the preferred form, actuator electrodes 12 and 16 are shown as being grounded and attached to grounded waveguide 10 and 13, and 14 and 15, for ease of manufacture and simplistic control. It should be apparent that actuator electrodes 12 and 16 could be made separate and apart from the grounded waveguide 10, 13, 14, and 15 to provide more flexible control of the RF switch operation by providing independent electrostatic control voltages on the actuator electrode 12 and 16 using control lines 12b and 16b and having the same contact area of and in alignment with actuator electrodes 28 and 30, respectively. In the preferred form, ground control voltages are applied to lines 12b and 16b so that the left and right bottom actuator electrodes are grounded. In operation, electrostatic control voltages are applied to lines 24b, 26b, 28b, 30b, 74b, and 76b to control the electrostatic forces between actuator electrode pairs 24 and 74, 28 and 12, 76 and 26, and 30 and 16. In controlling the electrostatic control voltages on lines 12b, 16b, 24b, 26b, 28b, 30b, 74b, 76b, electrostatic push and pull forces are created between actuator electrode pairs 24 and 74, 28 and 12, 76 and 26, and 30 and 16 causing the diaphragm 22 to move up and down in controlled motion so as to move the bridge 32 up and down in controlled motion in proximity over the gap 21 between the front and back waveguides 18 and 20 so as to couple and decouple the capacitive coupling between the front and back center waveguides 18 and 20.

An RF signal can propagate between the back and front center waveguides 18 and 20 during coupling, and can not propagate from the back and front center waveguides 18 and 20 during decoupling. The grounded coplanar waveguide traces 10, 13, 14, 15, 18 and 20 are preferably made of gold and operate as transmission lines. The grounded coplanar waveguide formed by traces 10, 13, 14, 15, 18, and 20 that are preferably covered by the optional thin dielectric over the area defined by the bridge electrode 32a. With the dielectric, the RF MEMS switch is a capacitive AC coupling RF MEMS switch. Without the thin dielectric, the RF MEMS switch can operate as a DC coupling RF MEMS switch.

The RF switch OFF state impedance when the bridge electrode 32 raised is determined by the gap 21 in the center waveguides 18 and 20 and the parasitic capacitance to the bridge electrode 32 in the full up position. Center waveguides 18 and 20 function as RF inputs and RF outputs over an RF transmission line. The gap 21 is sized for large electrical isolation between the center waveguides 18 and 20. The ON state impedance with the bridge electrode 32 lowered onto the dielectric 88 is determined by the two parasitic capacitors formed between respective center waveguides 18 and 20 and the bridge electrode 32 when the bridge electrode 32 is pulled down on top of the gap 21 to capacitively bridge the gap 21 with two series capacitors.

To turn ON the capacitive bridge in the RF MEMS switch, the actuator electrodes 24, 26, 28, 30, 74 and 76, may be energized with an appropriate control electrostatic voltage. The bottom diaphragm electrodes 28 and 30 are controlled relative to the preferred ground control voltage on the lower electrodes 12 and 16. The upper diaphragm actuator electrodes 24 and 26 are controlled with an electrostatic voltage relative to the top actuator electrodes 74 and 76. With difference control voltages between the lower diaphragm actuator electrodes 28 and 30 and the lower electrodes 12 and 16, and additionally between electrodes 24 and 26 relative to electrodes 74 and 76, an electrostatic pull down force will exist to flex the diaphragm 22 to bring the bridge electrode 32 into capacitive coupling proximity with the gap 21 of center waveguides 18 and 20.

The RF MEMS switch can be oppositely turned OFF in a similar manner by applying opposite control electrostatic voltages to the electrodes 28, 30, 24, 26, 74, and 76 so as to discharge the turn on electrode capacitance while simultaneously energizing the electrodes to pull-up the MEMS diaphragm 22 and RF bridge electrode 32. The polarities of the controlling voltages are reversed to achieve a similar but opposite pull-down or pull-up operation. The electrode areas for pull-down and pull-up can be made to any area desired to create the appropriate forces independent of the RF bridge electrode geometry. Similarly, the RF bridge electrode 32 can be made to an area to optimize the RF coupling independent of the MEMS actuator electrodes 28, 30, 24, 26, 74, and 76. The bridge electrode 32 may be in direct contact with center coplanar waveguides 18 and 20 as an alternative arrangement for direct contacting operation of the RF MEMS switch.

The RF MEMS switch may be operated in a linear mode where the MEMS diaphragm 22 may be driven to flex with an AC signal applied to the actuator electrodes 24, 26, 28, 30, 74, 76, 12, and 16, such that, an RF signal through the center waveguide 18 and 20 may be directly modulated. Modulation of an RF carrier may be achieved by varying the capacitive coupling from RF input to RF output by variably controlling the flexing distance between the bridge 32 and the gap 21. In this direct modulation operation, the RF MEMS switch becomes an RF modulation element using the control actuator lines 12b, 16b, 24b, 28b, 26b, 30b, 74b, and 76b. Modulation from input to output of the center waveguides 18 and 20 is enabled by applying a DC bias on the diaphragm electrodes 24, 26, 28, 30, 74, 76, 12, and 16, to partially pull down the RF bridging electrode 32, bringing the bridge electrode 32 in constant proximity to the RF center waveguides lines 18 and 20, to set a DC biased capacitive coupling of the modulator electrode 32 to the center waveguide transmission lines 18 and 20 as DC biased coupling. AC modulation signal is then applied in addition to this DC biased coupling to the actuator electrode lines 12b, 28b, 26b, 30b, 74b, and 76b, resulting in AC linear motions of the bridging electrode 32, and a time varying impedance of the RF transmission line of the center waveguide 18 and 20 with the varying impedance modulation in synchronism to the AC modulation signal. The controlling potentials can have a DC bias component for setting the amount of coupling by placing the bridge 32 at a DC bias distance from the gap 21 and having an AC modulation component superimposed upon the DC bias signal for AC modulation of a communication signal communicated between the front and back center waveguides 18 and 20.

As may now be apparent, the RF MEMS switch is characterized as having an encapsulated diaphragm 22 with actuator electrodes 24, 26, 28, 30, 74, 76, 12, and 16 equilaterally displaced about the center diaphragm positioned bridge 32 centered over a gap 21 of a center waveguide having two portions 18 and 20. The two substrates 82 and 70 offer contamination free encapsulation for improved reliability. The RF MEMS switch offers an improved electrode configuration that is a hermetically sealed and self-enclosed MEMS structure using a minimal area and minimum mass suspension diaphragm 22. The RF MEMS switch offers minimal RF distorting through transmission switch lines with minimal RF losses using symmetrical ON and OFF switching for improved speed. The two independent MEMS processes are used to fabricate the opposing wafers. The electrode area for RF coupling with MEMS actuation potentials and the DC and AC coupling of the transmission lines, can be independently controlled during design and manufacturing. The RF MEMS switch may be used for grounded microstrip operation, RF modulator operation, as well as ON and OFF switch operation. The RF MEMS switch has applications in communication systems where the device can be used as an RF transmission line switch, a variable RF attenuator, an RF modulator, or as part of beam forming and antenna diversity networks by forming RF MEMS switched time delay elements. Those skilled in the art can make enhancements, improvements, and modifications to the invention, and these enhancements, improvements, and modifications may nonetheless fall within the spirit and scope of the following claims.

What is claimed is:

1. A switch comprising,
  a MEMS substrate,
  a diaphragm suspended from and attached to the substrate, the diaphragm being suspended equilaterally from the MEMS substrate,
  a bridge disposed on the diaphragm, the diaphragm being flexible to move the bridge up and down,
  a plurality of equilaterally displaced electrodes surrounding the bridge, the electrodes are controlled by controlling voltages to provide electrostatic forces for flexibly moving the diaphragm up and down to move the bridge up and down,
  an RF substrate bonded to MEMS substrate for encapsulating the diaphragm, and
  a center waveguide comprising a front center waveguide and a back center waveguide separate by a gap and disposed on the RF substrate, the bridge serving to couple the front center waveguide to the back center waveguide when the diaphragm is actuated to bring the bridge down towards the gap and serving to decouple the front center waveguide from the back center waveguide when the diaphragm is actuated to bring the bridge up away from the gap.

2. The switch of claim 1 further comprising,
left and right grounded waveguides extending in parallel to and surrounding the front and back center waveguides for electrically shielding and forming of an RF transmission line with the front and back center waveguides.

3. The switch of claim 1 further comprising,
four suspension arms extending from the diaphragm and coupled to the MEMS substrate for equilaterally suspending the diaphragm.

4. The switch of claim 1 wherein,
the diaphragm has a plurality of apertures for passing partial pressure gas for minimizing resistance to switching motion and damping during flexing of the diaphragm.

5. The switch of claim 1 further comprising,
an insulating dielectric disposed over the gap to isolate the bridge from the front and back center waveguides for providing capacitive coupling between front and back center waveguides for providing capacitive coupling when the bridge is actuated down.

6. The switch of claim 1 wherein,
the bridge making direct physical contact with both the front and back center waveguides for providing DC coupling between the front and back center waveguides.

7. The switch of claim 1 wherein,
the plurality of equilaterally displaced electrodes comprise left and right lower actuator electrodes disposed on the RF substrate, and left and right lower diaphragm actuator electrodes.

8. The switch of claim 7 wherein,
left and right lower actuator electrodes are in vertical alignment with the left and right lower diaphragm actuator electrodes.

9. The switch of claim 7 wherein,
left and right lower actuator electrodes are in vertical alignment with left and right lower diaphragm actuator electrodes, the switch further comprising, and
left and right lower diaphragm actuator electrodes control lines for providing electrostatic potentials for flexing the diaphragm for actuating the bridge up and down.

10. The switch of claim 9 wherein,
the electrostatic potential are modulated for modulating the bridge up and down as the diaphragm flexes up and down for modulating a signal communicated between the front and back center waveguides.

11. The switch of claim 10 wherein the left and right upper actuator electrodes are in vertical alignment with left and right upper diaphragm actuator electrodes, the switch further comprising, left and right upper diaphragm actuator electrodes control lines and left and right upper actuator electrodes for providing electrostatic potentials for flexing the diaphragm for actuating the bridge up and down.

12. The switch of claim 1 wherein the plurality of equilaterally displaced electrodes comprise, left and right upper actuator electrodes disposed on the substrate, and left and right upper diaphragm actuator electrodes.

13. The switch of claim 12 wherein, the left and right upper actuator electrodes are in vertical alignment with left and right upper diaphragm actuator electrodes.

14. A switch comprising, a MEMS substrate, a diaphragm suspended from and attached to the substrate, the diaphragm being suspended equilaterally from the MEMS substrate, a bridge disposed on the diaphragm, the diaphragm being flexible to move the bridge up and down, a plurality of equilaterally displaced electrodes surrounding the bridge, the electrodes are controlled by controlling voltages to provide electrostatic forces for flexibly moving the diaphragm up and down to move the bridge up and down, an RF substrate bonded to MEMS substrate for encapsulating a center waveguide comprising a front center waveguide and a back center waveguide separate by a gap, the bridge serving to couple the front center waveguide to the back center waveguide when the diaphragm is actuated to bring the bridge down towards the gap and serving to decouple the front center waveguide from the back center waveguide when the diaphragm is actuated to bring the bridge up away from the gap, left and right grounded waveguides extending in parallel to and surrounding the front and back center waveguides for forming a transmission line with the front and back center waveguides, a plurality of suspension arms extending from the diaphragm and coupled to the RM MEMS substrate for equilaterally suspending the diaphragm, and an insulating dielectric disposed over the gap to isolate the bridge from the front and back center waveguides for providing capacitive coupling between front and back center waveguides for providing capacitive when the bridge is actuated down.

15. The switch of claim 14 wherein a plurality of equilaterally displaced electrodes comprise, left and right lower actuator electrodes disposed on the RF substrate, left and right lower diaphragm actuator electrodes opposing the left and the right lower actuator electrodes, left and right upper actuator electrodes disposed on the MEMS substrate, and left and right upper diaphragm actuator electrodes opposing the left and right upper actuator electrodes.

16. The switch of claim 14 wherein, the left and right lower actuator electrodes and left and right lower diaphragm actuator electrodes and left and right upper actuator electrodes and left and right upper diaphragm actuator electrodes have respective control lines for providing electrostatic potentials between left and right lower actuator electrodes and left and right lower diaphragm actuator electrodes and between left and right upper actuator electrodes and left and right upper diaphragm actuator electrodes, the electrostatic potentials serving to create electrostatic forces for flexing the diaphragm up and down for respectively decoupling and coupling the front and back center waveguides.

17. The switch of claim 16 wherein, the electrostatic potentials are AC biased potentials for modulating a communication signal communicated between the front and back center waveguides.

18. The switch of claim 17 wherein, the AC biased potentials contain a DC component for displacing the bridge above the gap and an AC component for modulating the communication signal communicated between the front and back center waveguides.

* * * * *